United States Patent
Lutz et al.

(10) Patent No.: US 8,015,228 B2
(45) Date of Patent: Sep. 6, 2011

(54) DATA PROCESSING APPARATUS AND METHOD FOR PERFORMING A RECIPROCAL OPERATION ON AN INPUT VALUE TO PRODUCE A RESULT VALUE

(75) Inventors: David Raymond Lutz, Austin, TX (US); Christopher Neal Hinds, Austin, TX (US)

(73) Assignee: ARM Limited, Cambridge (GB)

( * ) Notice: Subject to any disclaimer, the term of this patent is extended or adjusted under 35 U.S.C. 154(b) by 1251 days.

(21) Appl. No.: 11/058,420

(22) Filed: Feb. 16, 2005

(65) Prior Publication Data
US 2006/0184602 A1    Aug. 17, 2006

(51) Int. Cl.
*G06F 7/38*    (2006.01)
(52) U.S. Cl. .................. 708/502; 708/500; 708/605
(58) Field of Classification Search .................. 708/500, 708/502, 605, 654
See application file for complete search history.

(56) References Cited

U.S. PATENT DOCUMENTS

| | | | |
|---|---|---|---|
| 3,828,175 A | 8/1974 | Amdahl et al. | |
| 4,878,190 A * | 10/1989 | Darley et al. | 708/605 |
| 4,999,801 A * | 3/1991 | Katsuno | 708/500 |
| 5,077,659 A * | 12/1991 | Nagata | 712/210 |
| 5,220,524 A | 6/1993 | Hesson | |
| 5,249,149 A | 9/1993 | Cocanougher et al. | |
| 5,274,580 A | 12/1993 | Keryvel et al. | |
| 5,537,345 A | 7/1996 | Nakano | |
| 5,768,170 A | 6/1998 | Smith | |
| 5,928,318 A * | 7/1999 | Araki | 708/650 |
| 5,956,263 A * | 9/1999 | Narita et al. | 708/525 |
| 6,115,733 A | 9/2000 | Oberman et al. | |
| 6,341,300 B1 | 1/2002 | Shankar et al. | |
| 6,598,063 B1 | 7/2003 | Tang et al. | |

(Continued)

FOREIGN PATENT DOCUMENTS

EP    0 372 566    6/1990

(Continued)

OTHER PUBLICATIONS

Office Action mailed Mar. 9, 2009 in co-pending U.S. Appl. No. 11/058,421.

(Continued)

*Primary Examiner* — Chuong D Ngo
(74) *Attorney, Agent, or Firm* — Nixon & Vanderhye P.C.

(57) ABSTRACT

A data processing apparatus and method are provided for performing a reciprocal operation on an input value d to produce a result value X. The reciprocal operation involves iterative execution of a refinement step to converge on the result value, the refinement step performing the computation: $X_i = X_{i-1} * M$, where $X_i$ is an estimate of the result value for the i-th iteration of the refinement step, and M is a value determined by a portion of the refinement step. The data processing apparatus comprises a register data store having a plurality of registers operable to store data, and processing logic operable to execute instructions to perform data processing operations on data held in the register data store. The processing logic is responsive to a single refinement instruction to implement the portion of the refinement step by performing at least a multiply-accumulate operation in which the input value, a value derived from the previous estimate of the result value, and a constant are used as inputs of the multiply-accumulate operation. The constant is determined from the single refinement instruction without reference to the register data store. Such an approach improves code density, and improves efficiency of use of registers of the register data store.

12 Claims, 8 Drawing Sheets

U.S. PATENT DOCUMENTS

| | | |
|---|---|---|
| 6,711,603 B1 | 3/2004 | Takenaka |
| 6,732,134 B1 | 5/2004 | Rosenberg et al. |
| 6,912,559 B1 | 6/2005 | Ho et al. |
| 7,346,642 B1 | 3/2008 | Briggs et al. |
| 7,366,748 B1 | 4/2008 | Tang et al. |
| 2002/0116431 A1 | 8/2002 | Ho et al. |
| 2004/0093367 A1 | 5/2004 | Shearer |
| 2006/0064454 A1 | 3/2006 | Wang et al. |
| 2006/0179092 A1 | 8/2006 | Schmookler |
| 2006/0184594 A1 | 8/2006 | Lutz |

FOREIGN PATENT DOCUMENTS

| | | |
|---|---|---|
| EP | 0 938 042 | 8/1999 |
| GB | 2 372 353 | 8/2002 |
| JP | A 07 253874 | 10/1995 |
| JP | A 10 083279 | 3/1998 |
| JP | A 11 288411 | 10/1999 |
| WO | WO 00/45251 | 8/2000 |

OTHER PUBLICATIONS

Office Action mailed Sep. 23, 2008 in co-pending U.S. Appl. No. 11/058,421.

Office Action mailed Sep. 29, 2009 in co-pending U.S. Appl. No. 11/058,421.

Translation of Japanese official action, Mar. 2, 2010, in corresponding Japanese Application No. 2005341816.

* cited by examiner

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | table input |
|---|---|---|---|---|---|---|---|---|---|---|---|---|---|---|---|---|---|---|---|---|---|---|---|---|---|---|---|---|---|---|---|---|---|
| reciprocal - fixed input starting with 1 | 1 | I7 | I6 | I5 | I4 | I3 | I2 | I1 | I0 | | | | | | | | | | | | | | | | | | | | | | | | I7 I6 I5 I4 I3 I2 I1 I0 |
| reciprocal - float input | | | | | | | | | | F7 | F6 | F5 | F4 | F3 | F2 | F1 | F0 | | | | | | | | | | | | | | | | F7 F6 F5 F4 F3 F2 F1 F0 |
| reciprocal square root - fixed starting with 01 | 0 | 1 | I6 | I5 | I4 | I3 | I2 | I1 | I0 | | | | | | | | | | | | | | | | | | | | | | | | 0 I6 I5 I4 I3 I2 I1 I0 |
| reciprocal square root - fixed starting with 1 | 1 | I6 | I5 | I4 | I3 | I2 | I1 | I0 | | | | | | | | | | | | | | | | | | | | | | | | | 1 I6 I5 I4 I3 I2 I1 I0 |
| reciprocal square root - float with even exponent | | | | | | | | | | | F6 | F5 | F4 | F3 | F2 | F1 | F0 | | | | | | | | | | | | | | | | 0 F6 F5 F4 F3 F2 F1 F0 |
| reciprocal square root - float with odd exponent | | | | | | | | | | | F6 | F5 | F4 | F3 | F2 | F1 | F0 | | | | | | | | | | | | | | | | 1 F6 F5 F4 F3 F2 F1 F0 |

REFINEMENT STEP FOR RECIPROCAL

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 0 | 0 | 1 | 1 | 1 | $V_{D_4}$ | | | | 1 | 1 | 1 | 0 | 1 | 1 | $V_{D_3} V_{D_2} V_{D_1} V_{D_0}$ | | | | 0 | 1 | 0 | T | 0 | Q | $V_{M_4}$ | 0 | $V_{M_3} V_{M_2} V_{M_1} V_{M_0}$ | | | |

VRECPE

Fig. 8B

| 1 | 1 | 1 | 0 | 0 | 1 | 1 | 1 | $V_{D_4}$ | 1 | 1 | 1 | 0 | 1 | 1 | $V_{D_3} V_{D_2} V_{D_1} V_{D_0}$ | 0 | 1 | 0 | T | 1 | Q | $V_{M_4}$ | 0 | $V_{M_3} V_{M_2} V_{M_1} V_{M_0}$ |

VRSQRTE

Fig. 8C

| 1 | 1 | 1 | 0 | 0 | 1 | 0 | 0 | $V_{D_4}$ | 0 | $V_{N_3} V_{N_2} V_{N_1} V_{N_0}$ | $V_{D_3} V_{D_2} V_{D_1} V_{D_0}$ | 1 | 1 | 1 | 1 | $V_{N_4}$ | Q | $V_{M_4}$ | 1 | $V_{M_3} V_{M_2} V_{M_1} V_{M_0}$ |

VRECPS

Fig. 8D

| 1 | 1 | 1 | 0 | 0 | 1 | 0 | 0 | $V_{D_4}$ | 1 | $V_{N_3} V_{N_2} V_{N_1} V_{N_0}$ | $V_{D_3} V_{D_2} V_{D_1} V_{D_0}$ | 1 | 1 | 1 | 1 | $V_{N_4}$ | Q | $V_{M_4}$ | 1 | $V_{M_3} V_{M_2} V_{M_1} V_{M_0}$ |

VRSQRTS

DATA PROCESSING APPARATUS AND METHOD FOR PERFORMING A RECIPROCAL OPERATION ON AN INPUT VALUE TO PRODUCE A RESULT VALUE

BACKGROUND OF THE

1. Field of the Invention

The present invention relates to a data processing apparatus and method for performing a reciprocal operation on an input value to produce a result value.

2. Background

There are a number of data processing applications where it is often required to perform reciprocal operations, a reciprocal operation being an operation of the form 1/Fn(d), where d is the input value. Two such reciprocal operations that are often required involve computing the reciprocal of the input value, i.e. 1/d, or the reciprocal square root of the input value, i.e. $1/\sqrt{d}$. These particular two reciprocal operations are often used, for example, in graphics processing applications.

Dedicated hardware may be developed to perform such reciprocal operations but typically it is desirable to keep the data processing apparatus as small as possible, and to re-use hardware logic wherever possible.

A known technique for determining the results of complex functions such as reciprocal and reciprocal square root functions, which does not require dedicated hardware, employs iterative execution of a computation in order to converge on the result value. One particular such iterative process is commonly referred to as the Newton-Raphson method. In accordance with the Newton-Raphson method, an initial estimate of the result value is made, and then a refinement step is iteratively executed in order to converge on the actual result value.

The Motorola AltiVec technology uses such a Newton-Raphson refinement technique for evaluating reciprocal and reciprocal square root functions. In accordance with the approach taken by the Motorola AltiVec technology, a number of instructions are issued to load required constant values into registers, and then to determine an initial estimate value for the result value, whereafter a sequence of multiply-accumulate instructions are issued to perform the refinement step.

In a data processing apparatus it is typically desired to reduce the power consumption of the data processing apparatus whilst also increasing the speed of operation of the data processing apparatus. With regard to the handling of reciprocal operations such as those discussed above, it would be desirable to increase the code density of the code required to implement the reciprocal operation and also improve the efficiency of use of the registers, to thereby yield a reduction in power consumption and an improvement in speed of operation. With regard to the use of registers, it should be noted that efficiency is particularly impacted, since each time the refinement step is performed, any constant value that has been loaded in a working register will typically be overwritten during execution of the refinement step, and accordingly if the refinement step needs to be repeated again, the required constant needs to be loaded again into a working register.

U.S. Pat. No. 6,115,733 describes a technique for calculating reciprocals and reciprocal square roots. The Newton-Raphson approach is again used, and the refinement step includes as part of its process the multiplication of two values to produce a product, which is then subtracted from a constant. This would typically be implemented by some form of multiply-accumulate operation, with the required constant having been first loaded into a working register. However, in accordance with the technique in U.S. Pat. No. 6,115,733, such a multiply-accumulate operation is not performed, and instead an estimate of the result of such a multiply-accumulate operation is generated by instead merely performing the required multiplication, and then inverting the result to generate an approximation of the result of the multiply-accumulate operation. This avoids the need to load the required constant into a register and hence makes more efficient use of the register file, and also removes the need for a load instruction to be performed to load a constant into a register.

Hence, the technique in U.S. Pat. No. 6,115,733 will provide some improvement in code density, and will make more efficient use of the working registers. However, to enable this improvement to be obtained, the technique in U.S. Pat. No. 6,115,733 replaces the required computation of a portion of the refinement step with a different computation which will produce an approximation of the result that would have been performed had the true computation been performed.

Accordingly, it would be desirable to develop a technique which enabled such improvements in code density and efficient use of registers to be achieved, but without the need to replace the required computation with a different computation that merely produces an approximation of the result that would have been produced by the true computation performed as part of the refinement step.

SUMMARY

Viewed from a first aspect, a data processing apparatus performs a reciprocal operation on an input value 'd' to produce a result value 'X', the reciprocal operation involving iterative execution of a refinement step to converge on the result value. The refinement step performs the computation: $X_i = X_{i-1} * M$, where $X_i$ is an estimate of the result value for an i-th iteration of the refinement step, and M is a value determined by a portion of the refinement step. The data processing apparatus comprises: a register data store having a plurality of registers operable to store data; processing logic operable to execute instructions to perform data processing operations on data held in the register data store; the processing logic being responsive to a single refinement instruction to implement said portion of the refinement step by performing at least a multiply-accumulate operation in which the input value, a value derived from a previous estimate of the result value, and a constant are used as inputs of the multiply-accumulate operation, the constant being determined from the single refinement instruction without reference to the register data store.

A single refinement instruction is provided to implement a critical portion of the refinement step, and without the requirement for a register to hold a constant required by that critical portion of the refinement step, and accordingly avoiding the need for a load instruction to load that constant into the register. In contrast to the technique of U.S. Pat. No. 6,115,733, the true multiply-accumulate operation is performed using the input value, a value derived from a previous estimate of the result value, and the constant, but the single refinement instruction itself determines the constant used, thereby avoiding any need to load the constant into the register data store prior to performing the multiply-accumulate operation.

Further, the use of a single instruction to cause that critical portion of the refinement step to be performed significantly improves code density. Accordingly, it has been found that the above technique provides a particularly efficient mechanism for performing a reciprocal operation involving iterative execution of a refinement step to converge on the required result value.

The multiply-accumulate operation may take a variety of forms. However, in one embodiment, the multiply-accumulate operation comprises the steps of: multiplying the input value and the value derived from a previous estimate of the result value to produce an intermediate value; and subtracting the intermediate value from the constant. As discussed earlier, the constant is determined directly from the single refinement instruction, and accordingly does not need to be loaded into the register data store.

The reciprocal operation may take a variety of forms. In one embodiment, the reciprocal operation produces as the result value the reciprocal of the input value, and the value derived from a previous estimate of the result value is the previous estimate of the result value. In one particular embodiment, the processing logic is operable to implement said portion of the refinement step by performing the computation: $M=2-X_{i-1}*d$. Hence, in this embodiment, the portion of the refinement step computing the value M comprises solely the multiply-accumulate operation, and this portion of the refinement step is implemented by a single refinement instruction.

In an alternative embodiment, the reciprocal operation produces as the result value the reciprocal square root of the input value, and the value derived from a previous estimate of the result value is a square of the previous estimate of the result value. In one particular embodiment, the processing logic is operable to implement said portion of the refinement step by performing the computation: $M=\frac{1}{2}(3-Z_{i-1}*d)$, where $Z_{i-1}=(X_{i-1})^2$.

Hence in accordance with this embodiment, the portion of the refinement step used to produce the value M involves a multiply-accumulate operation to produce a value which is then halved in order to produce the value M. In one particular embodiment, the input value and the result value are floating point numbers, and the halving of the output from the multiply-accumulate operation is achieved by subtracting one from the exponent value produced by the multiply-accumulate operation.

In one embodiment, the input value and the value derived from a previous estimate of the result value are stored in the register data store prior to execution of the single refinement instruction. Two operands within the single refinement instruction can then specify the registers of the register data store containing the input value and the value derived from a previous estimate of the result value, respectively.

In one embodiment, on a first iteration of the refinement step the previous estimate of the result value is an initial estimate selected dependent on predetermined bits of the input value, and on a subsequent iteration of the refinement step the previous estimate of the result value is the output of a preceding iteration of the refinement step. Typically, the initial estimate is determined with reference to a lookup table, in which predetermined bits of the input value are used to perform the lookup process.

The processing logic can take a variety of forms. However, in one embodiment, the processing logic is a pipelined data processing unit.

Viewed from a second aspect, a data processing apparatus performs a reciprocal operation on an input value 'd' to produce a result value 'X', the reciprocal operation involving iterative execution of a refinement step to converge on the result value. The refinement step performs the computation: $X_i=X_{i-1}*M$, where $X_i$ is an estimate of the result value for an i-th iteration of the refinement step, and M is a value determined by a portion of the refinement step. The data processing apparatus comprises: register data store means having a plurality of registers operable to store data; processing means for executing instructions to perform data processing operations on data held in the register data store; the processing means being responsive to a single refinement instruction to implement said portion of the refinement step by performing at least a multiply-accumulate operation in which the input value, a value derived from a previous estimate of the result value and a constant are used as inputs of the multiply-accumulate operation, the constant being determined from the single refinement instruction without reference to the register data store means.

Viewed from a third aspect, a method is provided of operating a data processing apparatus to perform a reciprocal operation on an input value 'd' to produce a result value 'X'. The reciprocal operation involving iterative execution of a refinement step to converge on the result value, the refinement step performing the computation: $X_i=X_{i-1}*M$, where $X_i$ is an estimate of the result value for an i-th iteration of the refinement step, and M is a value determined by a portion of the refinement step. The data processing apparatus comprising a register data store having a plurality of registers operable to store data, and processing logic operable to execute instructions to perform data processing operations on data held in the register data store. The method comprises the steps of: responsive to a single refinement instruction, implementing said portion of the refinement step by performing within the processing logic at least a multiply-accumulate operation in which the input value, a value derived from a previous estimate of the result value and a constant are used as inputs of the multiply-accumulate operation; and determining the constant to be used for the multiply-accumulate operation from the single refinement instruction without reference to the register data store.

DESCRIPTION OF EXAMPLE EMBODIMENTS

Figure 1:
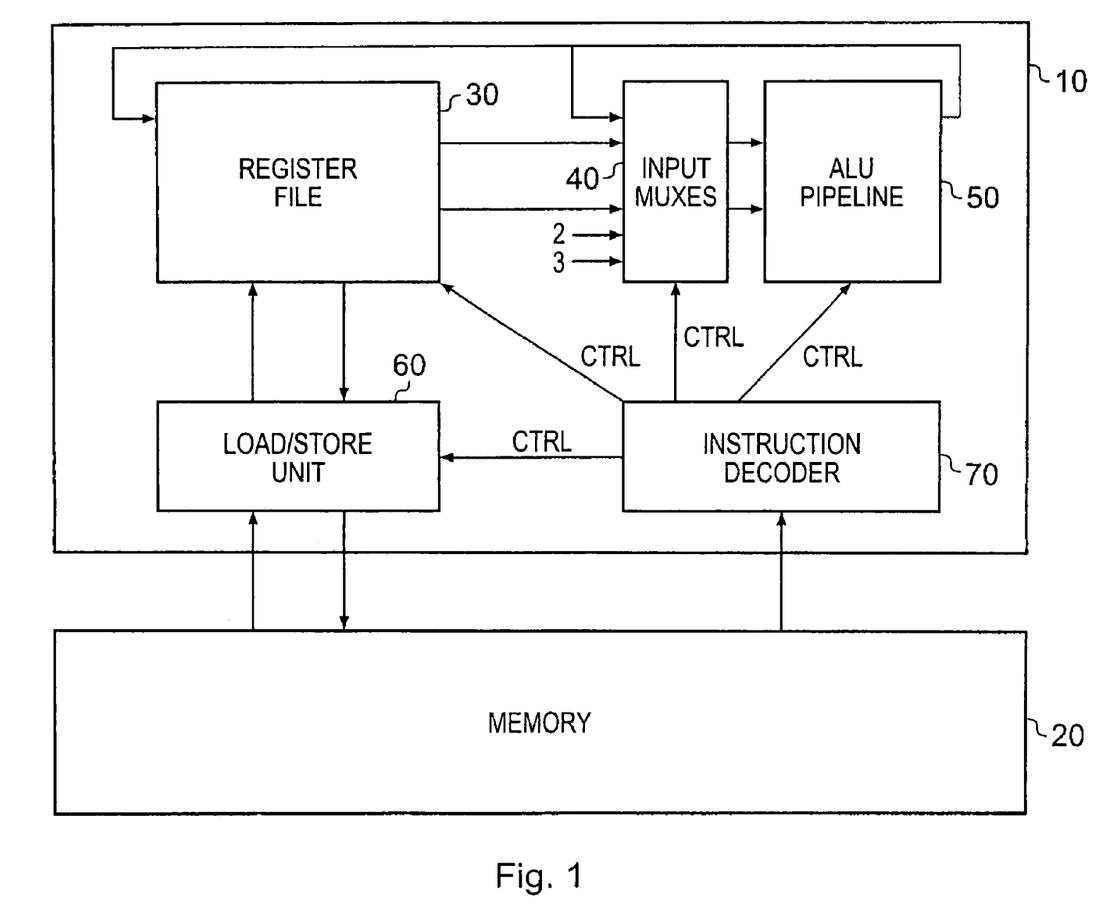
FIG. 1 is a block diagram of a data processing apparatus in accordance with one example embodiment.

FIG. 1 is a block diagram schematically illustrating a data processing apparatus 10 in accordance with one example embodiment. The data processing apparatus 10 is coupled to a memory system 20 in which instructions and data values required by the data processing apparatus are stored. The data processing apparatus 10 is arranged to execute a sequence of instructions which are retrieved from the memory 20. In particular, each instruction is retrieved from the memory 20 by an instruction decoder 70, which decodes the instruction and then dependent on the instruction sends appropriate control signals to other elements of the data processing apparatus to cause the operation specified by the instruction to be implemented.

The data processing apparatus 10 incorporates a load/store unit 60 for loading data values from memory 20 into a register file 30 of the data processing apparatus, and for storing data values from the register file 30 to the memory 20.

An Arithmetic Logic Unit (ALU) pipeline 50 is provided for performing arithmetic operations on data values, with the input data values to the ALU pipeline 50 being provided by input multiplexers 40. Typically, when executing an arithmetic operation within the ALU pipeline 50, the required input data values will be routed from the register file 30 via the input multiplexers 40 to the ALU pipeline 50 (these data values having been stored in the register file 30 prior to execution of the instruction specifying the arithmetic operation).

A data value output from the ALU pipeline 50 may be routed to the register file 30 for storage in an appropriate destination register, and/or can be forwarded back as an input to the input multiplexers 40 if that data value is required as an input for a subsequent arithmetic operation. In accordance with example embodiments, two constant values are also provided to the input multiplexers 40 which can be selected by the input multiplexers 40 dependent on a control signal provided from the instruction decoder 70.

As will be discussed in more detail later, if the data processing apparatus is performing a reciprocal operation involving iterative execution of a refinement step, then a portion of the refinement step may require the performance of a multiply-accumulate operation, in which two values are multiplied and then subtracted from a constant. More particularly, in one embodiment, the reciprocal operation produces as a result value the reciprocal of an input value, and in this case the constant required is the value "2", this value being provided as one of the inputs to the input multiplexer 40 without any need to previously have loaded that value into a register of the register file 30. Similarly, in another embodiment, the reciprocal operation produces as a result value the reciprocal square root of an input value, and in this case the constant required is the value "3". Again, as shown in FIG. 1, this constant value is provided directly to the input multiplexers 40 without having first been loaded in a register of the register file 30.

Figure 2:
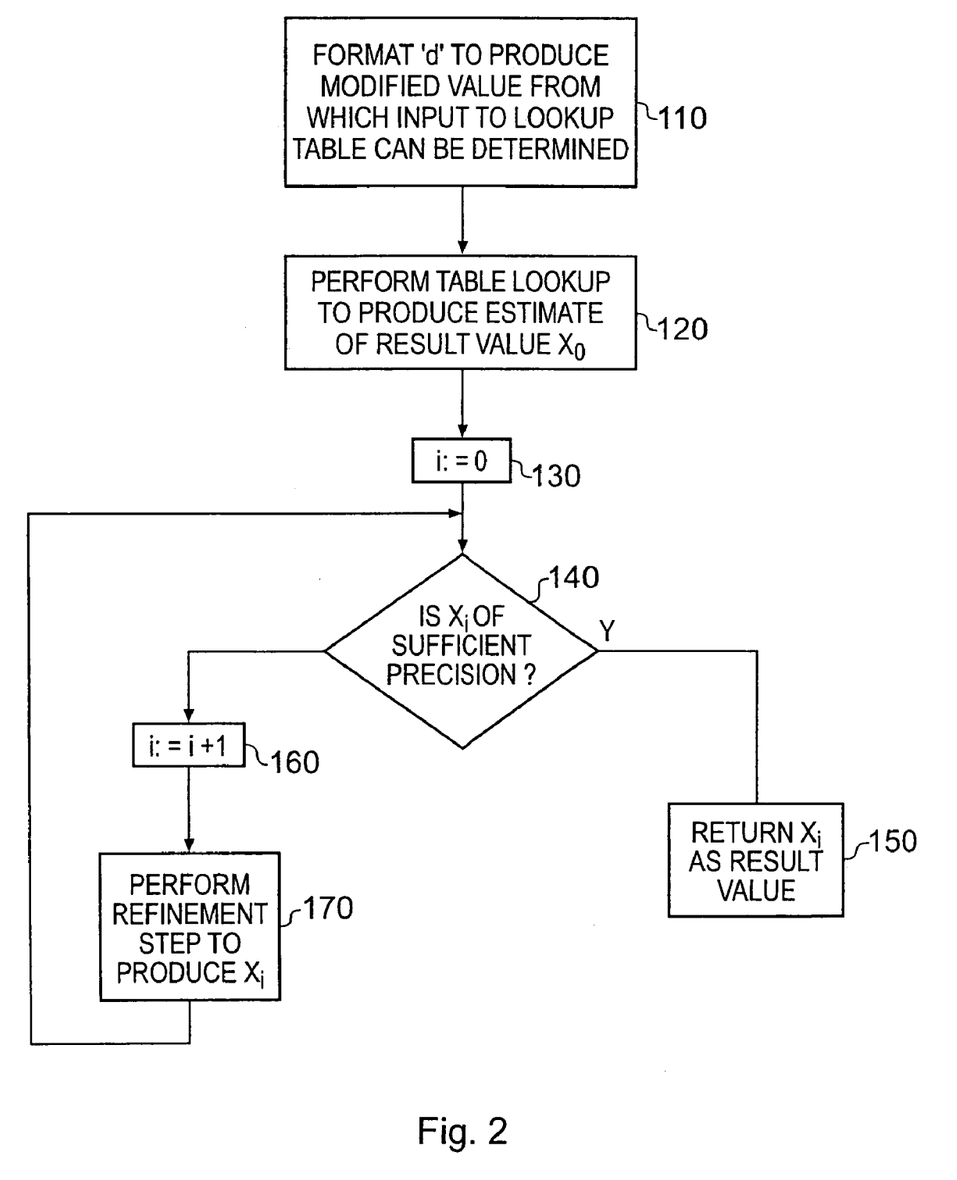
FIG. 2 is a flow diagram illustrating the steps performed within the data processing apparatus in one embodiment in order to implement a reciprocal operation.

FIG. 2 is a flow diagram illustrating the sequence of steps performed in order to implement a reciprocal operation of the above type within the data processing apparatus 10. Firstly, at step 110, the input value the subject of the reciprocal operations is formatted to produce a modified input value from which the bits required to perform a table lookup can be extracted, the output from the table lookup being used to derive an initial estimate for the result value.

The reciprocal operation may specify as an input value a fixed point data value or a floating point data value. A fixed point data value is one where a decimal point is implied to exist at a predetermined point within the data value. For example, a 16.16 fixed point format assumes that a 32-bit value has 16 bits prior to the decimal point and 16 bits after the decimal point. An integer value is a particular instance of a fixed point value in which the decimal point is considered to exist immediately to the right of the least significant bit.

A floating point data value in the defined normal range can be expressed as follows:

$$\pm 1.x * 2^y$$

where: x=fraction
1.x=significand (also known as the mantissa)
y=exponent

A floating point data value in the defined subnormal range can be expressed as follows:

$$\pm 0.x * 2^{min}$$

where: x=fraction
0.x=significand (also known as the mantissa)
min=−126 for single precision values and −1022 for double precision values The embodiment described herein is arranged to process normal floating point values and special cases (infinities, Not-a-Number values (NaNs) and zeros), and subnormal values are flushed to a signed zero value. However, an alternative embodiment could be arranged to directly process subnormal values using the same principles as described herein.

Considering first the situation where the input value the subject of the reciprocal operation is a floating point value, a modified input value is evaluated within the ALU pipeline 50, such that the significand of the modified input value is within a predetermined range. More particularly, if the reciprocal operation produces as the result value the reciprocal of the input value, then the modified input value is one whose significand is within the range greater than or equal to 0.5 and less than 1. At step 110, such evaluation of the modified input value can be achieved through appropriate formatting of the input value within the ALU pipeline 50 to allow certain fraction bits specified by the original input value to be selected as the table input, as is illustrated schematically in FIG. 3.

Figure 3:
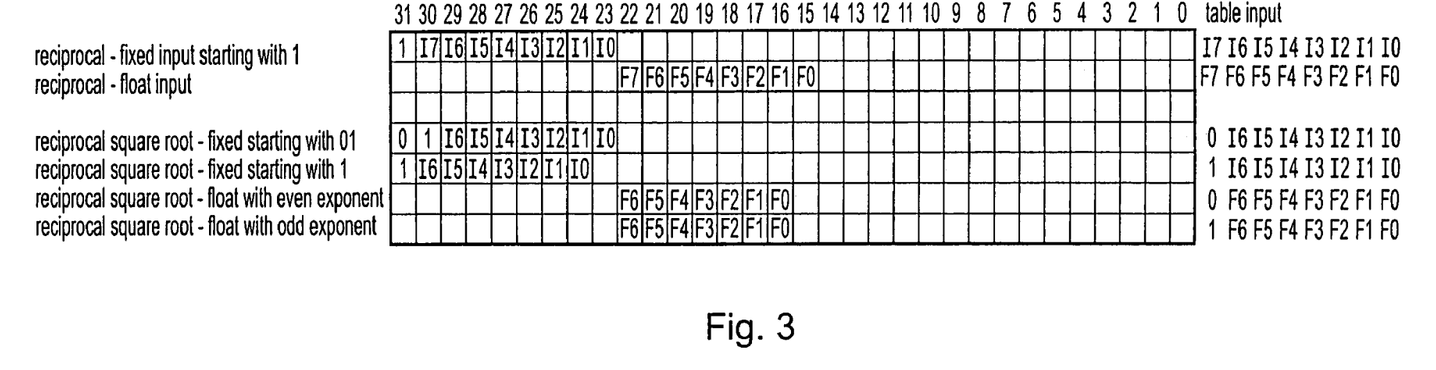
FIG. 3 is a diagram illustrating how modified input values are used to access a lookup table during execution of the process of FIG. 2.

As shown in FIG. 3, considering a single precision floating point value, i.e. a 32 bit value, the fraction of the floating point value is provided by bits 22 to 0. The input value is of the form $1.ab \ldots \times 2^n$, and accordingly the significand will naturally be within the range greater than or equal to 1 and less than 2. An effective one bit right shift of the significand is required in order to produce a significand within the range greater than or equal to 0.5 and less than 1, along with an associated increment of the exponent value. Hence, the significand of the modified input value is 0.1ab . . . and the table lookup is performed on the basis of the value 0.1ab . . . .

However, it is not actually necessary to perform the shift operation in order to produce the modified input value, as the same effect can be realised merely by appropriate selection of the fraction bits from the original input value, with the leading "1" being implied. In particular, as shown in FIG. 3, the eight most significant bits of the fraction (F7 to F0) are extracted and used to perform the table lookup.

Considering again floating point input values, but considering the situation where the reciprocal operation produces as the result value the reciprocal square root of the input value, the formatting performed at step 110 selects a modified input value whose significand is in the range greater than or equal to 0.25 and less than 1. This will ensure that the output value from the lookup table can directly be used to form a significand within the range greater than or equal to 1 and less than 2.

In one embodiment, as shown in FIG. 3, the necessary formatting at step 110 is performed within the ALU pipeline 50 by multiplexer logic which allows selection of appropriate bits from the 23 bit fraction of the input value having regard to the form of the modified input value (which does not actually have to be produced at this stage). In particular, in this situation the modified input value can be considered to be the result of either an effective 1 bit or an effective 2 bit right shift of the significand of the input value, along with associated incrementing of the exponent of the input value, so as to produce a modified input value whose exponent is an even number. The initial estimate of the result value can then be derived using the table output value to form the significand of the estimate of the result value, and producing the exponent of the estimate of the result value by halving and negating the exponent of the modified input value. Since the exponent of the modified input value needs to be halved to produce the exponent of the initial result estimate, this is the reason why the modified input value is selected such that it has an exponent with an even number.

With reference to the last two entries in FIG. 3, it can be seen that a different table input is generated dependent on whether the input floating point value had an even exponent or an odd exponent. In particular, if the input floating point value had an even exponent, then the modified input value would be a value resulting from an effective 2 bit right shift so as to retain an even exponent in the modified input value, whereas if the input value had an odd exponent, an effective 1-bit right shift would produce the modified input value, such that the modified input value would have an even exponent.

It should be noted that the bits illustrated in FIG. 3 are the bits of the original input value, and that, as mentioned earlier, the modified input value does not need to directly be produced at this stage, but instead can be simulated through the way in which the original input bits are selected as the table input. In particular, as shown in FIG. 3, if the input floating point value has an even exponent, then an 8 bit table input value is produced in which the most significant bit is a 0, and the remaining 7 bits are formed by the most significant 7 bits of the fraction of the input value. Similarly, if the floating point value has an odd exponent, then the 8 bit table input value has a logic one value as the most significant bit, followed by 7 bits corresponding to the most significant 7 bits of the fraction of the input value.

Considering the situation now where the input value is a fixed point value, then in one embodiment the formatting step 110 includes an effective shift operation performed by software such that a logic one value appears in either the most significant bit position or the next to most significant bit position. It is the resulting modified input value which is then used by the ALU pipeline 50 to determine the input to the lookup table, and it is this modified input value which is shown in FIG. 3. In particular, FIG. 3 illustrates a 32-bit fixed point value, and it is assumed that the software has already modified the original value such that the leading 1 is either at bit position 31 or bit position 30.

If the reciprocal operation produces as the result value the reciprocal of the input value, the software performs any required left shift so that the leading 1 of the fixed point value is in the most significant bit position (i.e. bit 31), as shown by the top entry in FIG. 3. Thereafter, at step 110 the ALU pipeline 50 is arranged to select as the table input the 8 bits forming bits 30 to 23 of the modified input value.

Considering the situation where the reciprocal operation is producing as the result value the reciprocal square root of the input value, then software will perform an left shift by an even number of bit positions of the original fixed point value so that the leading 1 is in either one of the two most significant bit positions. In particular as shown in FIG. 3, if this results in the most significant bit (bit 31) being a logic zero value, then the 8 bit table input value is produced within the ALU pipeline 50 at step 110 by setting a zero in the most significant bit position, and then using bits 29 to 23 to form the other 7 bits of the table input. If instead the modified fixed point value has a logic one value in the most significant bit position, then the table input value is selected to have a logic one value in the most significant bit position, and then uses bits 30 to 24 of the modified input value to form the remaining 7 bits of the table input value.

Following the formatting step at step 110, the table lookup is then performed at step 120 using the 8-bit table input value discussed above with reference to FIG. 3 in order to produce an estimate for the result value $X_0$. The lookup table used when the reciprocal operation produces as the result value the reciprocal square root of the input value will differ from the lookup table used when the reciprocal operation produces as the result value the reciprocal of the input value, but for either of these two types of reciprocal operation, the same lookup table can be used for both fixed point and floating point input values. The manner in which this estimate is produced from the output of the lookup table will be discussed in more detail later with reference to FIG. 4.

Thereafter, at step 130, a variable i is set equal to zero, and then at step 140 it is determined whether $X_i$ is of sufficient precision, i.e. whether the result value is of the required precision for a desired subsequent application. $X_0$ will have 8 bits of precision, and in some cases that may be sufficient. If so, then the process branches to step 150, where the value $X_i$ is returned as the result value.

However, if the value $X_i$ is not considered to be of sufficient precision, then at step 160 i is incremented by 1, and then at step 170 a refinement step is performed to produce a revised estimate of the result value $X_i$. The refinement step performed is dependent on whether the reciprocal operation produces the reciprocal of the input value or produces the reciprocal square root of the input value, and will be discussed in more detail later with reference to FIGS. 5 and 6. In embodiments of the present invention, each time the refinement step is performed, this effectively doubles the number of bits of precision in the result value. Accordingly, after the first iteration there will be effectively 16 bits of precision in the result value $X_i$.

After step 170, the process loops back to step 140 where it is again determined whether the result value $X_i$ is of sufficient precision. If not, the refinement step is repeated, but if the required precision has been produced, the process branches to step 150 where the result $X_i$ is returned.

Figure 4:
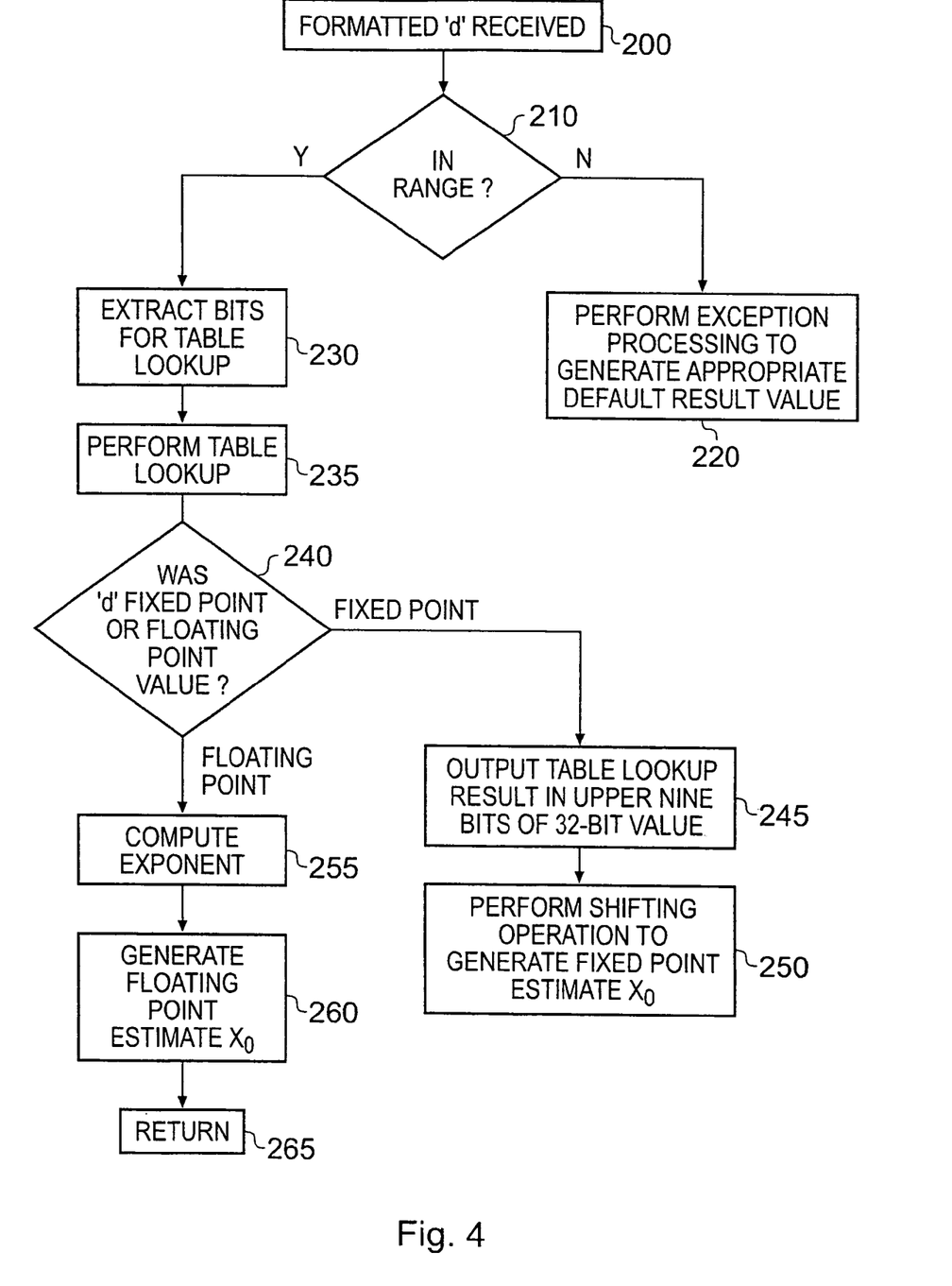
FIG. 4 is a flow diagram illustrating in more detail the generation of an initial estimate for the result value of the reciprocal operation in accordance with one embodiment.

FIG. 4 is a flow diagram illustrating in more detail the manner in which the table lookup process is used to produce the initial estimate value $X_0$. At step 200, the formatted input value is received, whereafter at step 210 it is determined whether that formatted input value is within the required range. Fixed-point inputs are interpreted as having an implicit binary point to the left of all of the bits, i.e. any input bit pattern is interpreted as being greater than or equal to zero and less than one. The range of valid inputs is further restricted as follows:

1) When the reciprocal operation is producing the reciprocal of the fixed-point input, in-range means the high order bit is one (so the number is greater than or equal to ½).
2) When the reciprocal operation is producing the reciprocal square root of the fixed-point input, in-range means that at least one of the high-order two bits are one (so the number is greater than or equal to ¼).

For floating-point inputs, the determination as to whether the formatted input value is within range involves merely a determination that the original input floating point value is within the defined 'normal' range.

If at step 210 it is determined that the formatted input value is not within range, then exception processing is performed at step 220 in order to generate an appropriate default result value. In particular, if the input value is a fixed point value but the most significant bit of the value considered by the ALU pipeline 50 (see FIG. 3) is not a logic one value when producing a reciprocal function, or neither of the most significant two bits are a logic one value when performing a reciprocal square root function, then the exception processing at step 220 will return a result value comprising all 1s.

Considering the situation where the reciprocal operation is determining the reciprocal of an input floating point value, then if the input value is a NaN, then step 220 will return a default NaN, if the input value is a zero or a subnormal value, then the exception processing step 220 will return an infinity of the same sign, and if the input value is an infinity, the exception processing step 220 will return a zero of the same sign.

If the reciprocal operation is producing a reciprocal square root of an input floating point value, then if the input value is a NaN, a negative normal or a negative infinity, then the exception processing step 220 will return a default NaN, if the input value is a zero or a subnormal (either positive or negative) then the exception processing step 220 will return a positive infinity value, and if the input value is a positive infinity, then the exception processing step 220 will return a positive zero value.

Assuming at step 210, it is determined that the formatted input value is within range, then at step 230 selected bits are extracted in order to perform the table look up, this process having been described earlier with reference to FIG. 3. Thereafter, the table look up is performed at step 235 using the 8 bit table input value described earlier with reference to FIG. 3 in order to produce an 8-bit output value from the lookup table.

At step 240, the process branches either of two ways dependent on whether the input value is a fixed point value or a floating point value. If the input value is a fixed point value, then the process branches to step 245, where the table lookup output value is output in the upper nine bits of a 32-bit value (the most significant of the nine bits being an implied logic one value).

Thereafter additional steps will typically be taken by software at step 250 to perform a right shift operation sufficient to reverse the effect of the earlier left shift operation that was performed to produce the modified input value.

If the input value is a floating point value, then the process instead branches to step 255, where the exponent for the initial estimate is computed. As discussed earlier, when the reciprocal operation produces as the result value the reciprocal of the input value, the ALU pipeline selects as the modified input value the result of an effective 1 bit right shift of the significand to bring the significand within the required range, along with an associated increment to the exponent. This ensures that the output from the lookup table can be used directly to form a significand within the range greater than or equal to 1 and less than 2, and accordingly all that is required at step 255 to generate the exponent of the initial estimate is to increment the input value's exponent by 1 and then negate that value to produce the exponent for the initial estimate.

When the reciprocal operation produces as the result value the reciprocal square root of the input value, then as discussed earlier the ALU pipeline selects as the modified input value the result of either an effective 1 bit or 2 bit right shift, along with an associated incrementing of the exponent to form the exponent of the modified input value. At step 255, this exponent of the modified input value is determined, and then the exponent of the initial estimate is derived by dividing that exponent of the modified input value by two and negating the resultant value. This process can be readily performed given that the modified input value will always have an even exponent due to the selection of either an effective 1 bit or a 2 bit right shift of the significand dependent on the value of the original exponent of the input value.

Thereafter the initial floating point estimate $X_0$ is generated at step 260, by using the 8-bit output from the lookup table as the most significant 8 bits of the fraction, and using the exponent computed at step 255 as the exponent. The sign is the same as the sign of the original input value. Thereafter, at step 265, the process ends.

In one embodiment, separate estimate instructions are provided for both of the above described types of reciprocal operation, but the same estimate instruction is used irrespective of whether the input value is a fixed point value or a floating point value. If the input value is a floating point value, then that estimate instruction specifies as an operand the original input value, and the ALU pipeline is responsive to the estimate instruction to evaluate the modified input value, perform the table look up process, and derive the initial estimate of the result value from the table output value. However, if the input value is a fixed point value, then given the large number of different formats for such fixed point numbers (in theory the implied binary point may be at any bit position within the fixed point value as known only by the software), the original input value is modified by the software prior to issue of the estimate instruction and the estimate instruction specifies that modified input value, as discussed earlier with reference to FIG. 3. Further, execution of the estimate instruction within the ALU pipeline merely produces the table output value in the upper 9 bits of a 32-bit value, and the software is then responsible for performing any required shifting in order to generate the initial fixed point estimate $X_0$, based on a knowledge of the format of the original input fixed point value.

As discussed earlier with reference to FIG. 2, once the initial estimate $X_0$ has been determined, then at step 140 it can be determined whether that estimate is of sufficient precision. Considering first the situation where the input value is a fixed point value, then it will often be the case that the original estimate of the result value $X_0$ will have the required level of precision. However, if not, then any refinement step required at step 170 of FIG. 2 is performed in software.

If instead the input value is a floating point value, then in one embodiment additional instructions are defined which can be executed within the ALU pipeline 50 in order to perform the required refinement step identified at step 170 of FIG. 2. In particular, the refinement step can be considered to perform the computation: $X_i = X_{i-1} * M$ (where $X_i$ is the estimate of the result value for the i-th iteration)

In situations where the reciprocal operation is computing the reciprocal of the input value, then:

$$M = 2 - X_{i-1} * d \text{ (where } d \text{ is the input value).}$$

Alternatively, if the reciprocal operation is computing the reciprocal square root of the input value, then:

$$M = \tfrac{1}{2}(3 - Z_{i-1} * d), \text{ where } Z_{i-1} = (X_{i-1})^2.$$

In accordance with one embodiment, the data processing apparatus specifies two specific instructions, one of which causes the data processing apparatus to compute M when the reciprocal operation is determining the reciprocal of the input value, and the other of which causes the data processing apparatus to compute M when the reciprocal operation is determining the reciprocal square root of the input value.

Figure 5:
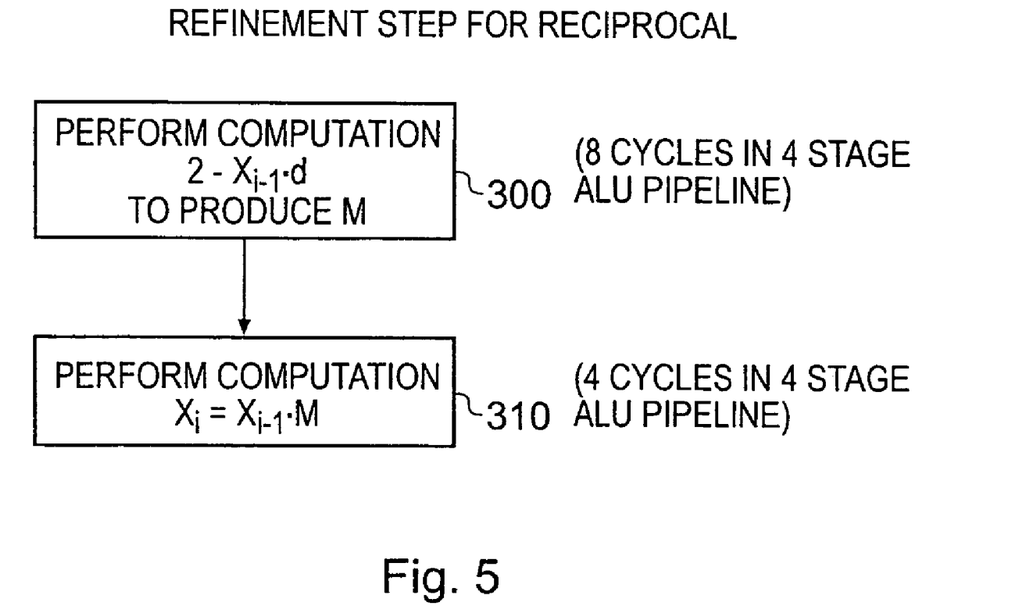
FIG. 5 is a flow diagram illustrating the sequence of computations performed in accordance with one embodiment in order to implement a refinement step when determining the reciprocal of an input value.

The performance of the refinement step when the reciprocal operation is determining the reciprocal of the input value is illustrated schematically in FIG. 5. At step 300, the data processing apparatus is arranged to perform the computation $M=2-X_{i-1}*d$. This is achieved through issuance of a single instruction, referred to herein as the vrecps instruction. This instruction specifies as two of its operands registers containing the values $X_{i-1}$ and d. The constant value 2 required by the computation is implied by the decoding of the instruction within the instruction decoder 70, which sends the necessary control signal to the input multiplexers 40 to cause the constant 2 to be selected at the appropriate point.

In one embodiment, the ALU pipeline 50 contains two functional units, namely an add unit which processes add operations and a multiply unit which processes multiply operations, each unit comprising a four stage pipeline. Performance of the computation defined at step 300 involves execution for four cycles in each functional unit. More particularly, in the first four cycles a multiplication operation is performed in the multiply functional unit, and then in the next four cycles a subtraction of the product from the constant value 2 is performed in the add functional unit. Accordingly, this step will take eight clock cycles within the ALU pipeline 50.

Thereafter, at step 310, the computation $X_i=X_{i-1}*M$ is performed by issuance of a further multiply instruction, this computation taking a single pass through the ALU pipeline, and accordingly taking a further four cycles.

Figure 6:
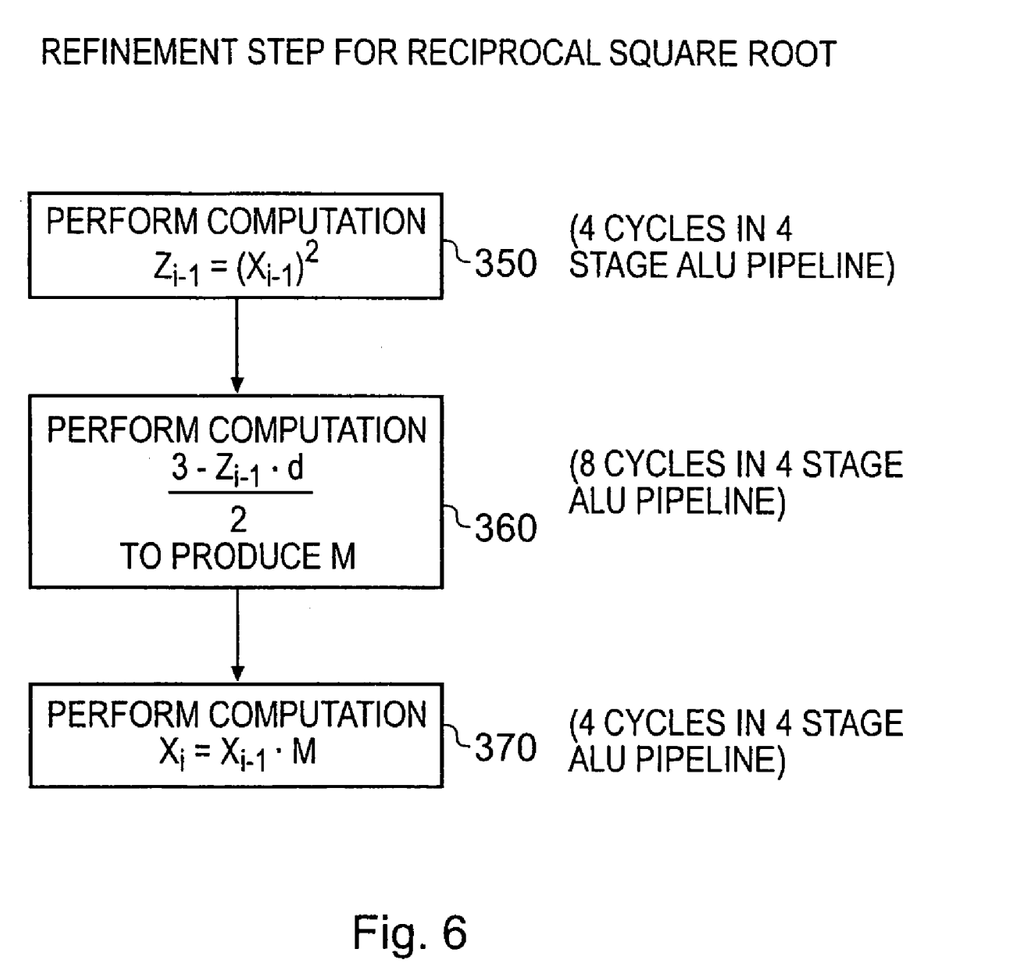
FIG. 6 is a flow diagram illustrating the sequence of computations performed in accordance with one embodiment in order to implement the refinement step when determining the reciprocal square root of an input value.

FIG. 6 is a flow diagram illustrating the steps performed to implement the refinement step when the reciprocal operation is determining the reciprocal square root of the input value. At step 350, a multiply instruction is issued to cause the previous estimate of the result value to be squared to produce a value $Z_{i-1}$. This takes a single pass though the ALU pipeline 50, and accordingly takes four cycles.

Thereafter, at step 360, a single instruction is issued, hereafter referred to as the vrsqrts instruction, which causes the data processing apparatus to perform the computation $M=\frac{1}{2}(3-Z_{i-1}*d)$, where $Z_{i-1}=(X_{i-1})^2$. During a first pass through the ALU pipeline, the multiplication step is performed, whereafter in a subsequent pass through the pipeline the product is subtracted from the constant value 3. As with the previously mentioned refinement instruction vrecps, the constant value 3 is implied by the decoding of the instruction performed within the instruction decoder 70, which then sends the necessary control signal to the input multiplexers 40 to cause the constant value 3 to be selected at the appropriate point.

The division of the multiply-accumulate result by a factor of two is achieved purely by subtracting one from the exponent value, this being performed in the exponent path of the ALU pipeline during the second pass through the ALU pipeline 50.

Thereafter, at step 370, the computation $X_i=X_{i-1}*M$ is performed, which takes a single pass through the ALU pipeline 50, and accordingly takes a further four cycles.

The following brief description illustrates the sequence of instructions that can be issued to implement the processes of FIGS. 5 and 6, along with an example indication as to how particular registers in register file 30 can be used:
Reciprocal
In register file, reg $S_0$ holds d $$reg\ S_1\ \text{holds}\ X\ \left(\text{where}\ X = \frac{1}{d}\right)$$

reg $S_2$ holds temporary values

The following sequence of instruction are performed:
vrecpe $S_1$, $S_0$ uses value in $S_0$ to perform table lookup to determine $X_0$, and
places $X_0$ in register $S_1$
vrecps $S_2$, $S_1$, $S_0$ performs computation $$M=2-X_0 d$$

and places M in register $S_2$
vmul $S_1$, $S_2$, $S_1$ performs computation $$X_1=X_0 \times M$$

and places $X_1$ in register $S_1$
The instructions vrecps and vmul are then repeated until result has desired precision.
Reciprocal Square Root
In register file reg $S_0$ holds d $$reg\ S_1\ \text{holds}\ X\ \left(\text{where}\ X = \frac{1}{\sqrt{d}}\right)$$

reg $S_2$ holds temporary values
The following sequence of instructions are performed:
vrsqrte $S_1$, $S_0$ uses value in $S_0$ to perform table lookup to determine $X_0$, and
places $X_0$ in register $S_1$
vmul $S_2$, $S_1$, $S_1$ performs computation $$Z_0=(X_0)^2$$

and places $Z_0$ in register $S_2$
vrsqrts $S_2$, $S_2$, $S_0$ performs computation $$M = \frac{(3 - Z_0 d)}{2}$$

and places M in register $S_2$
vmul $S_1$, $S_2$, $S_1$ performs computation $$X_1=X_0 \times M$$

and places $X_1$ in register $S_1$
The instructions vmul, vrsqrts and vmul are repeated until result has desired precision.

Figure 7:
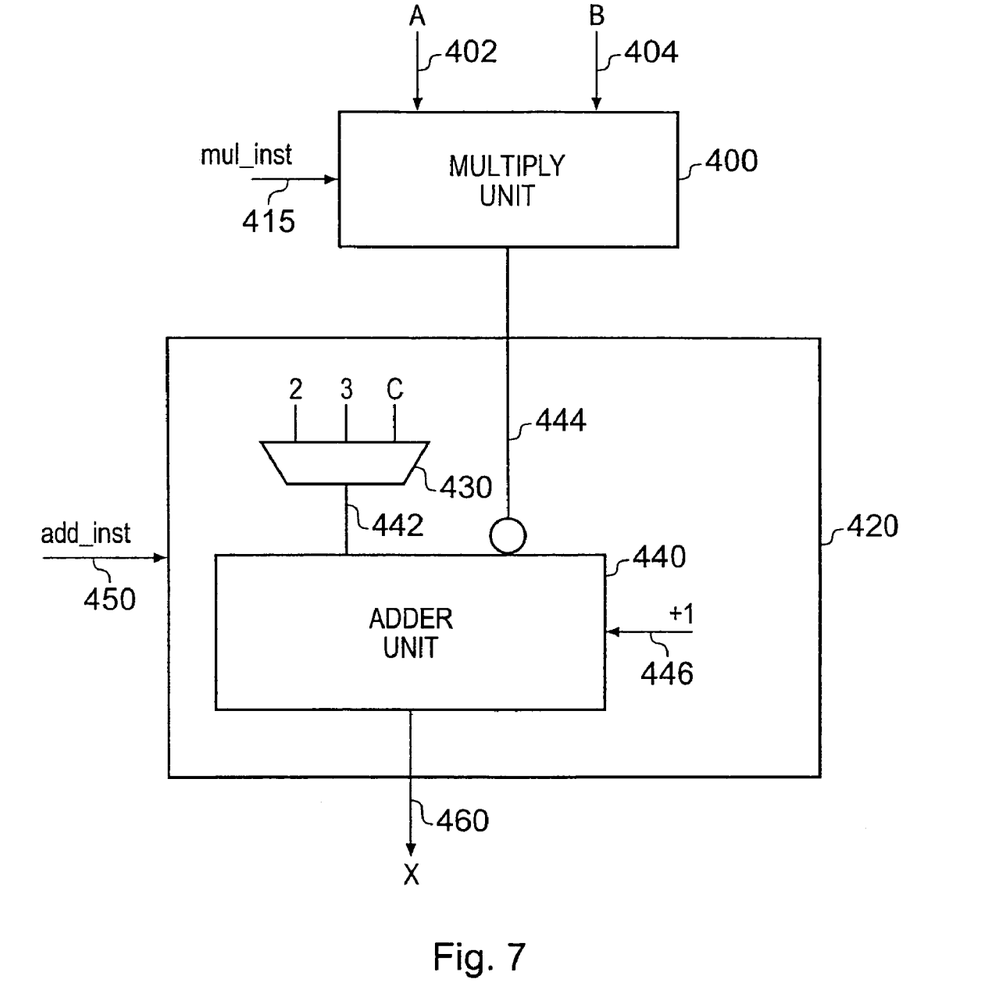
FIG. 7 is a diagram schematically illustrating elements provided within the data processing apparatus of FIG. 1 to implement the processes of FIG. 5 and 6.

FIG. 7 is a block diagram illustrating logic provided within the ALU pipeline 50 in order to implement the refinement steps of FIGS. 5 and 6. A multiply unit 400 is provided which can receive two input values A and B over paths 402, 404, respectively. Further, a control signal mul_inst is input to the multiply unit 400 over path 415 to control the operation of that multiply unit.

Accumulate logic 420 is also provided which includes an adder unit 440 arranged to receive over path 444 an inverted version of the output from the multiply unit 400, and also to receive over path 442 the output from a multiplexer 430. The adder unit also receives a carry-in value of +1 on path 446. The adder unit 440 can hence subtract the product generated by the multiply unit 400 from a value provided over path 442 from the multiplexer 430. To control the operation of the accumulate unit 420, a control signal add_inst is provided over path 450.

The multiplexer 430 has as inputs an operand C, a constant 2 and a constant 3. With reference to FIG. 1, the multiplexer 430 will actually typically reside within the input multiplexers 40 rather than the ALU pipeline 50 but, for simplicity of explanation of FIG. 7, has been shown as part of the accumulate logic 420 controlled by the add_inst control signal.

The control signal mul_inst will identify to the multiply unit 400 whether a normal multiply instruction is being executed or whether either of the earlier mentioned refinement instructions vrecps or vrsqrts are being performed. This information is required to enable the multiply unit to determine how to handle any exceptional conditions. In particular, if one of the operands A, B is +0 or −0 and the other operand A, B is +infinity or −infinity, then for a normal multiply operation the multiply unit will output a default NaN value. However, if the same situation arises when either of the refinement instructions are being performed, then the multiply unit will output a value 2 if the instruction is the vrecps instruction or will output a value 3/2 if the instruction is the vrsqrts instruction.

The control signal add_inst will identify whether the accumulate logic is performing an accumulate operation specified by a normal accumulate instruction, or if instead the instruction is either the vrecps instruction or the vrsqrts instruction, and this will cause appropriate selection of one of the inputs of the multiplexer 430. It will also determine whether the adder unit performs an addition or a subtraction (only the input paths for subtraction are shown in FIG. 7, but it will be appreciated that for addition it is merely necessary to provide the uninverted output from the multiply unit 400 to the adder unit 440 and to set the carry-in value to zero). For either the vrecps or the vrsqrts instruction, the adder unit will always perform a subtraction. In particular, for the vrecps instruction, the adder unit will perform the computation 2−A×B. For the vrsqrts instruction, the adder unit will perform the computation (3−A×B)/2. For the vrecps instruction, the operand A will be the value $X_{i-1}$ and the operand B will be the value d. For the vrsqrts instruction, the operand A will be $(X_{i-1})^2$ and the operand B will be d.

The following are six examples of reciprocal or reciprocal square root functions performed using the earlier-described apparatus in accordance with one embodiment:

1) Floating Point Reciprocal
Estimate Process
  d=6=40c00000
  1/d=0.1666667=3e2aaaab
  6=1.1000 0000×$2^2$ in floating point format
  The fraction is hence 0.1000 0000
The lookup process produces 0.01010101 as the returned value from the table
  =1.01010101 with a prepended 1

$$\text{Final exponent is} - (\exp + 1) = -3$$

$$\text{Returned estimate} = 3e2a8000$$
$$= 0.166504$$

Refinement Step
  d=6.0=40c00000
  $X_0$=0.166504=3e2a8000
  2=4000 0000

$$M = 2 - X_0 * d = 4000\ 0000 - (3e2a8000 \times 40c00000)$$
$$= 4000\ 0000 - 3f7c0009$$
$$= 3f801ffc$$

$$X_1 = M * X_0$$
$$= 3f801ffc \times 3e2a8000$$

$$X_1 = 3e2aaa9b = 0.1666664\ (\text{i.e. a good approximation to } 1/d)$$

$X_1$=3e2aaa9b=0.1666664 (i.e. a good approximation to 1/d)

2) Floating Point Reciprocal Square Root (with Odd Exponent)
Estimate Process
  d=0.875=3f60 0000
  1/√d=1.0690445=3f88 d677

$$d = 1.1100\ 0000 \times 2^{-1} \text{in floating point format (exponent is odd)}$$
$$= 0.1110\ 0000 \times 2^0$$

The lookup process gives 0.0001 0001 as returned value from table
  =1.0001 0001 with prepended 1

$$\text{Estimate exp} = -(-1+1)/2 = 0$$
$$\text{Returned Estimate} = 1.00010001 \times 2^0$$
$$= 3f888000$$

Refinement Step $$Z = X_0 * X_0$$
$$= 3f888000 * 3f888000$$
$$= 3f919080$$

$$M = (3 - Z*d)/2$$
$$= (4040\ 0000 - (3f919080 \times 3f600000))/2$$
$$= (4040\ 0000 - 3f7ebcc0)/2$$
$$= 3f8050c8$$

$$X_1 = X_0 * M$$
$$= 3f888000 \times 3f8050c8$$

$$X_1 = 3f88d625$$
$$= 1.0690352 \left(\text{i.e. a good approximation to } \frac{1}{\sqrt{d}}\right)$$

3) Floating Point Reciprocal Square Root (with Even Exponent)
Estimate Process
  d=6.0=40c00000
  1/√d=0.4082483=3ed105eb $$d = 6.0$$
$$= 1.10000000 \times 2^2 \text{in floating point format (exponent is even)}$$
$$= 0.01100000 \times 2^4 \text{when right shifted by 2}$$

Table lookup gives 0.10100010
=1.10100010 with 1 prepended
Estimate Exponent=−exp/2=−4/2=−2
Returned estimate=3ed10000

Refinement Step $$Z = X_0 * X_0$$
$$= 3ed10000 \cdot 3ed10000$$
$$= 3e2aa100$$

$$M = (3 - Z*d)/2$$
$$= (3 - (3e2aa100 \times 40c00000))/2$$
$$= (40400000 - 3f7ff180)/2$$

$$M = 3f80003a0$$

$$X_1 = X_0 * M$$
$$= 3ed10000 \cdot 3f8003a0$$

$$X_1 = 3ed105eb$$
$$= 0.4082483 \left(\text{i.e. a good approximation to } \frac{1}{\sqrt{d}}\right)$$

4. Fixed Point Estimate for 1/6, 16.16 Format
   input d=6=0000000000000110.0000000000000000 (binary)
   software performs left shift by 13 so that leading 1 is in the high order bit
   d'=1100000000000000.0000000000000000
   table lookup returns
   x'=1010101010000000.0000000000000000
   software restores 16.16 format by right shifting by 31−13=18 bit positions.
   $X_0$=0000000000000000.0010101010100000=0.166504
   true 1/6=0.166667 (6 significant digits)
5. Fixed Point Estimate for 1/√6, 16.16 Format
   input d=6=0000000000000110.0000000000000000 (binary)
   software performs left shift by 12 so that leading 1 is in the high order 2 bits.
   Note that left shift must be an even number of bit positions.
   d'=0110000000000000.0000000000000000
   table lookup returns
   x'=1101000100000000.0000000000000000
   software restores 16.16 format by right shifting by 23−(12/2)=17 bit positions.
   $X_0$=0000000000000000.01 101000010000000=0.408203
   true 1/√6 =0.408248 (6 significant digits) 6. Fixed Point Estimate for 1/√3, 16.16 Format
   input d=3=0000000000000011.0000000000000000 (binary)
   software performs left shift by 14 so that leading 1 is in the high order 2 bits.
   Note that left shift must be an even number of bit positions.
   d'=1100000000000000.0000000000000000
   table lookup returns
   x'=1001001110000000.0000000000000000
   software restores 16.16 format by right shifting by 23 −(14/2)=16 bit positions.
   $X_0$=0000000000000000.1001001110000000=0.576172
   true 1/√3=0.577350 (6 significant digits)

Figure 8A:
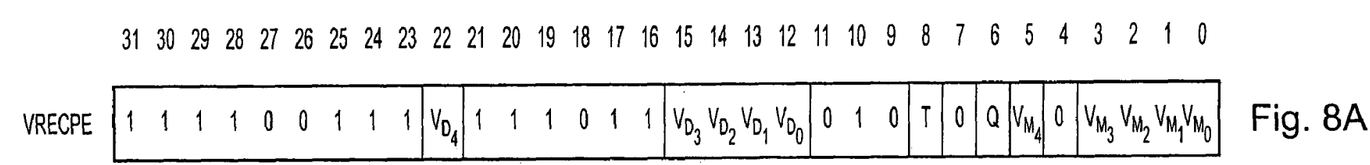
FIGS. 8A to 8D illustrate the format of estimate instructions and refinement step instructions in accordance with one embodiment.
Figure 8B:
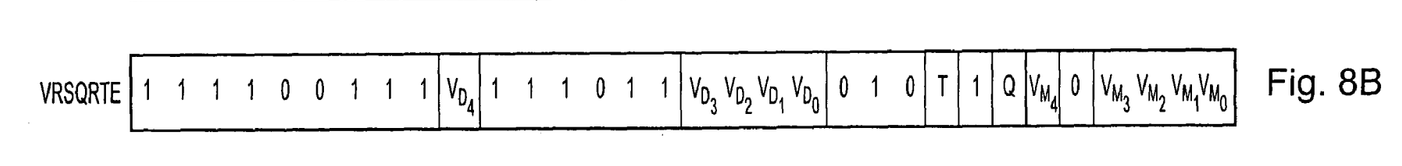

The estimate instructions and refinement instructions used in embodiments may take a variety of forms. FIGS. 8A to 8D illustrate example formats for these instructions. In particular, FIG. 8A illustrates the encoding of the estimate instruction used to determine an initial estimate for a reciprocal operation that would produce as the result value the reciprocal of the input value, whilst FIG. 8B illustrates the encoding of the estimate instruction used to determine an initial estimate for a reciprocal operation that would produce as the result value the reciprocal square root of the input value. In both cases Vm (5 bits) is an identification of the source register and Vd (5 bits) is the identification of the destination register.

In the embodiment disclosed in FIGS. 8A to 8D, the instructions are actually Single Instruction Multiple Data (SIMD) instructions for execution on an ALU pipeline arranged to perform SIMD processing. The Q bit (bit 6) indicates whether the data in the operand registers represents two 32-bit data values or four 32-bit data values. The ALU logic can in this embodiment operate on two 32-bit data values in parallel and hence can compute estimates for two input values at a time. For four input values, two values at a time are passed through the pipeline stages of the ALU pipeline. The T bit (bit 8) identifies the data type, i.e. whether the data is fixed point or floating point data.

Figure 8C:
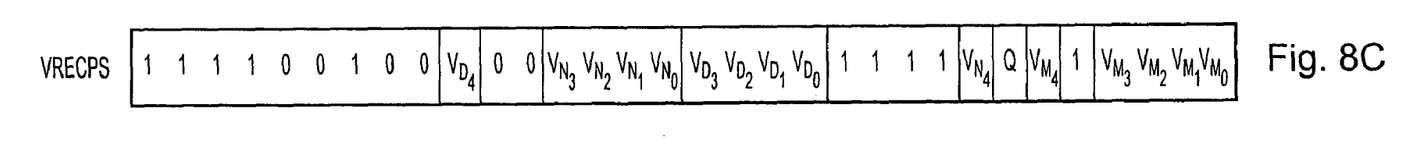
Figure 8D:
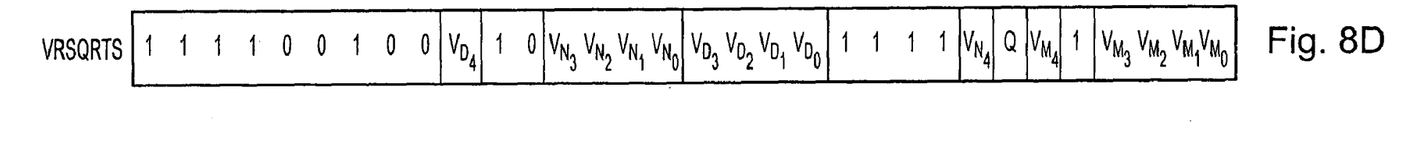

FIG. 8C illustrates an example of the format for the vrecps instruction, i.e. the refinement instruction used to perform the computation $M=2-X_{i-1}*d$ when the reciprocal operation produces as the result value the reciprocal of the input value. FIG. 8D illustrates an encoding for the vrsqrts instruction used to perform the computation $M=\frac{1}{2}(3-Z_{i-1}*d)$, where $Z_{i-1}=(X_{i-1})^2$, for instances where the reciprocal operation produces as the result value the reciprocal square root of the input value.

The values Vm and Vn identify the source registers and the value Vd identifies the destination register. Again in the illustrated embodiment the instructions are SIMD instructions for execution on an ALU pipeline arranged to perform SIMD processing, and the Q bit (bit 6) indicates whether the data in the operand registers represents two 32-bit data values or four 32-bit data values.

Given the above description, it will be appreciated that the above described embodiment provides an efficient technique for determining an initial estimate of a result value that will be produced by performing a reciprocal operation on an input value. In particular, the same processing logic is used to generate that initial estimate, irrespective of whether the input value is a fixed point value or a floating point value, and for a particular modified input value used as an input to the lookup table, the same table output value is generated irrespective of whether the input value is a fixed point value or a floating point value.

Furthermore, the earlier described embodiment provides a very efficient technique for implementing the refinement step performed when generating the result value from the initial estimate. In particular, for both the situation where the reciprocal operation is evaluating the reciprocal of the input value, and the situation where the reciprocal operation is evaluating the reciprocal square root of the input value, single refinement instructions are provided to cause the data processing apparatus to perform a critical portion of the refinement step. This significantly improves code density. Furthermore, the constants required in that portion of the refinement step are predetermined by the instruction themselves, and do not need to be loaded into the register file prior to execution of that portion of the refinement step. This is particularly beneficial with regard to improving the efficiency of register file usage, since each time the refinement step is performed, any constant value that had been written in the register file for that purpose would typically be overwritten, and accordingly would need to be rewritten back to the register file if the refinement step needed to be executed again.

Although particular example embodiments have been described herein, it will be apparent that the claims is not limited thereto, and that many modifications and additions may be made within their scope.

We claim:

1. A data processing apparatus for performing a reciprocal operation on an input value 'd' to produce a result value 'X', the reciprocal operation involving one or more iterations of a refinement step to generate the result value with a desired precision, the refinement step performing the computation:

$$X_i = X_{i-1} * M$$

where $X_i$ is an estimate of the result value for an i-th iteration of the refinement step, and M is a value determined by a portion of the refinement step, the data processing apparatus comprising:
a register data store having a plurality of registers operable to store data;
processing logic arranged to execute program instructions, said program instructions being decoded into control signals to cause said processing logic to perform data processing operations on data held in the register data store, each of said program instructions specifying a source register and a destination register, the reciprocal operation being performed by the processing logic executing a sequence of said program instructions comprising an initial estimate program instruction and a number of refinement program instructions, said number of program refinement instructions corresponding to a number of iterations of the refinement step required to generate the result value with the desired precision; and
an input multiplexer coupled to the processing logic,
the processing logic being responsive to each said refinement program instruction to implement said portion of a corresponding refinement step by performing at least a multiply-accumulate operation in which the input value, a value derived from a previous estimate of the result value, and a constant are used as inputs of the multiply-accumulate operation, the constant being determined by the input multiplexer in dependence on the refinement program instruction without reference to the register data store.

2. A data processing apparatus as claimed in claim 1, wherein the multiply-accumulate operation comprises the steps of:
multiplying the input value and the value derived from a previous estimate of the result value to produce an intermediate value; and
subtracting the intermediate value from the constant.

3. A data processing apparatus as claimed in claim 1, wherein the reciprocal operation produces as the result value the reciprocal of the input value, and the value derived from a previous estimate of the result value is the previous estimate of the result value.

4. A data processing apparatus as claimed in claim 3, wherein the processing logic is operable to implement said portion of the refinement step by performing the computation:

$$M = 2 - X_{i-1} * d.$$

5. A data processing apparatus as claimed in claim 1, wherein the reciprocal operation produces as the result value the reciprocal square root of the input value, and the value derived from a previous estimate of the result value is a square of the previous estimate of the result value.

6. A data processing apparatus as claimed in claim 5, wherein the processing logic is operable to implement said portion of the refinement step by performing the computation:

$$M = \tfrac{1}{2}(3 - Z_{i-1} * d), \text{ where } Z_{i-1} = (X_{i-1})^2.$$

7. A data processing apparatus as claimed in claim 1, wherein the input value and the value derived from a previous estimate of the result value are stored in the register data store prior to execution of the single refinement instruction.

8. A data processing apparatus as claimed in claim 1, wherein on a first iteration of the refinement step the previous estimate of the result value is an initial estimate selected dependent on predetermined bits of the input value, and on a subsequent iteration of the refinement step the previous estimate of the result value is the output of a preceding iteration of the refinement step.

9. A data processing apparatus as claimed in claim 1, wherein the input value and the result value are floating point numbers.

10. A data processing apparatus as claimed in claim 1, wherein the processing logic is a pipelined data processing unit.

11. A data processing apparatus for performing a reciprocal operation on an input value 'd' to produce a result value 'X', the reciprocal operation involving one or more iterations of a refinement step to generate the result value with a desired precision, the refinement step performing the computation:

$$X_i = X_{i-1} * M$$

where $X_i$ is an estimate of the result value for an i-th iteration of the refinement step, and M is a value determined by a portion of the refinement step, the data processing apparatus comprising:
register data store means having a plurality of registers operable to store data;
processing means for executing program instructions, said program instructions being decoded into control signals to cause said processing logic to perform data processing operations on data held in the register data store, each of said program instructions specifying a source register and a destination register, the reciprocal operation being performed by the processing logic executing a sequence of said program instructions comprising an initial estimate program instruction and a number of refinement program instructions, said number of program refinement instructions corresponding to a number of iterations of the refinement step required to generate the result value with the desired precision,
input multiplexer means for multiplexing inputs for the processing logic,
the processing means being responsive to each said refinement program instruction to implement said portion of a corresponding refinement step by performing at least a multiply-accumulate operation in which the input value, a value derived from a previous estimate of the result value and a constant are used as inputs of the multiply-accumulate operation, the constant being determined by the input multiplexer in dependence on the refinement program instruction without reference to the register data store means.

12. A method of operating a data processing apparatus to perform a reciprocal operation on an input value 'd' to produce a result value 'X', the reciprocal operation involving one or more iterations of a refinement step to generate the result value with a desired precision, the refinement step performing the computation:

$$X_i = X_{i-1} * M$$

where $X_i$ is an estimate of the result value for an i-th iteration of the refinement step, and M is a value determined by a portion of the refinement step, the data processing apparatus comprising a register data store having a plurality of registers operable to store data, processing logic that executes instructions to perform data processing operations on data held in the register data store, and an input multiplexer coupled to the processing logic, the method comprising the steps of:

executing a sequence of program instructions, said program instructions being decoded into control signals to perform the reciprocal operation, each of said program instructions specifying a source register and a destination register, said sequence comprising an initial estimate program instruction and a number of refinement program instructions, said number of refinement program instructions corresponding to a number of iterations of the refinement step required to generate the result value with the desired precision;

responsive to each said refinement program instruction, implementing said portion of a corresponding refinement step by performing within the processing logic at least a multiply-accumulate operation in which the input value, a value derived from a previous estimate of the result value and a constant are used as inputs of the multiply-accumulate operation; and determining the constant to be used for the multiply-accumulate operation by the input multiplexer in dependence on the refinement program instruction without reference to the register data store.

* * * * *